US011281357B2

(12) United States Patent
Covington et al.

(10) Patent No.: US 11,281,357 B2
(45) Date of Patent: Mar. 22, 2022

(54) METHODS AND SYSTEMS FOR TAXONOMY ASSIST AT DATA ENTRY POINTS

(71) Applicant: Snap-on Incorporated, Kenosha, WI (US)

(72) Inventors: Joshua Covington, San Juan Bautista, CA (US); Patrick S. Merg, Hollister, CA (US)

(73) Assignee: Snap-on Incorporated, Kenosha, WI (US)

( * ) Notice: Subject to any disclaimer, the term of this patent is extended or adjusted under 35 U.S.C. 154(b) by 7 days.

(21) Appl. No.: 17/060,608

(22) Filed: Oct. 1, 2020

(65) Prior Publication Data
US 2021/0019025 A1    Jan. 21, 2021

Related U.S. Application Data

(63) Continuation of application No. 16/852,652, filed on Apr. 20, 2020, now Pat. No. 10,860,180, which is a
(Continued)

(51) Int. Cl.
*G06F 3/0482* (2013.01)
*G06F 3/0484* (2022.01)
(Continued)

(52) U.S. Cl.
CPC .......... *G06F 3/0482* (2013.01); *G06F 3/0484* (2013.01); *G06F 3/04842* (2013.01); *G06F 40/166* (2020.01); *G06Q 10/20* (2013.01)

(58) Field of Classification Search
CPC .. G06F 3/0482; G06F 3/0484; G06F 3/04842; G06F 40/166; G06Q 10/20
See application file for complete search history.

(56) References Cited

U.S. PATENT DOCUMENTS 4,686,331 A    8/1987 Burgess
5,442,549 A    8/1995 Larson
(Continued)

FOREIGN PATENT DOCUMENTS

CA        2846561 A1    9/2014

OTHER PUBLICATIONS

International Searching Authority, European Patent Office, Written opinion of the international searching authority for international application No. PCT/US2015/057307, opinion completion date Dec. 17, 2015, 5 pages.
(Continued)

*Primary Examiner* — Dino Kujundzic
(74) *Attorney, Agent, or Firm* — McDonnell Boehnen Hulbert & Berghoff LLP

(57) ABSTRACT

A method and system provide for entering text into a text field by determining complete-text terms, displaying the complete-text terms, and receiving a selection of a complete-text term as text to be entered into the text field. In some cases, a complete-text term can include all prior text entries used to determine the complete-text terms. In other cases, a complete-text term can include only a portion or none of the prior text entries used to determine the complete-text term. The determination of the complete-text terms can be based on a vehicle identifier. The determination of the complete-text terms can be based on one or more complete-text term selection-limiters, such a location, use, or diagnostic trouble code associated with the vehicle. The system can include a vehicle service tool that requests a set of complete-text terms and receives the set from a complete-text term storage device or an off-board processor.

38 Claims, 6 Drawing Sheets

Related U.S. Application Data continuation of application No. 16/006,175, filed on Jun. 12, 2018, now Pat. No. 10,705,686, which is a continuation of application No. 14/529,135, filed on Oct. 30, 2014, now Pat. No. 10,025,764.

(51) Int. Cl.
*G06Q 10/00* (2012.01)
*G06F 40/166* (2020.01)
*G06F 3/04842* (2022.01)

(56) References Cited

U.S. PATENT DOCUMENTS

| | | | |
|---|---|---|---|
| 5,839,112 | A | 11/1998 | Schreitmueller et al. |
| 6,025,833 | A | 2/2000 | Duff |
| 6,141,608 | A | 10/2000 | Rother |
| 6,169,986 | B1 | 1/2001 | Bowman et al. |
| 6,263,322 | B1 | 7/2001 | Kirkevold et al. |
| 6,301,531 | B1 | 10/2001 | Pierro et al. |
| 6,377,965 | B1 | 4/2002 | Hachamovitch et al. |
| 6,564,213 | B1 | 5/2003 | Ortega et al. |
| 6,590,568 | B1 | 7/2003 | Astala et al. |
| 6,781,587 | B2 | 8/2004 | Grigor |
| 7,444,216 | B2 | 10/2008 | Rogers et al. |
| 7,890,526 | B1* | 2/2011 | Brewer ............... G06F 16/242 707/767 |
| 7,933,900 | B2* | 4/2011 | Reddy ............... G06F 16/972 707/732 |
| 7,945,438 | B2 | 5/2011 | Balmelli et al. |
| 7,984,057 | B2 | 7/2011 | Betz et al. |
| 8,245,143 | B2 | 8/2012 | Yach et al. |
| 8,275,786 | B1 | 9/2012 | Dave et al. |
| 8,356,041 | B2 | 1/2013 | Paek et al. |
| 8,438,148 | B1* | 5/2013 | Rakowski ......... G06F 16/90324 707/706 |
| 8,515,954 | B2 | 8/2013 | Gibbs et al. |
| 8,539,384 | B2 | 9/2013 | Hinckley et al. |
| 8,601,019 | B1 | 12/2013 | Weininger et al. |
| 8,645,825 | B1 | 2/2014 | Cornea et al. |
| 8,930,064 | B2 | 1/2015 | Merg et al. |
| 9,189,157 | B2 | 11/2015 | Pasquero et al. |
| 2002/0007237 | A1 | 1/2002 | Phung et al. |
| 2002/0007289 | A1 | 1/2002 | Malin et al. |
| 2004/0254928 | A1 | 12/2004 | Vronay et al. |
| 2005/0203918 | A1* | 9/2005 | Holbrook ............... G06Q 40/04 |
| 2006/0101074 | A1 | 5/2006 | Cancilla et al. |
| 2006/0142909 | A1 | 6/2006 | Grier et al. |
| 2008/0243488 | A1 | 10/2008 | Balmelli et al. |
| 2008/0312817 | A1* | 12/2008 | Kawauchi ........ G08G 1/096888 701/533 |
| 2009/0062978 | A1 | 3/2009 | Picard |
| 2009/0313035 | A1 | 12/2009 | Esser et al. |
| 2010/0083154 | A1 | 4/2010 | Takeshita |
| 2010/0306249 | A1 | 12/2010 | Hill et al. |
| 2011/0118934 | A1 | 5/2011 | Lowrey et al. |
| 2011/0161182 | A1 | 6/2011 | Racco |
| 2011/0201387 | A1* | 8/2011 | Paek ..................... G06F 40/274 455/566 |
| 2012/0260203 | A1 | 10/2012 | Commarford et al. |
| 2013/0041878 | A1 | 2/2013 | Satyanarayana et al. |
| 2013/0232006 | A1* | 9/2013 | Holcomb ............. G06F 16/951 705/14.54 |
| 2013/0314352 | A1 | 11/2013 | Zhai et al. |
| 2014/0071171 | A1 | 3/2014 | McGowan et al. |
| 2014/0074343 | A1 | 3/2014 | Fish et al. |
| 2014/0077972 | A1 | 3/2014 | Rathi et al. |
| 2014/0142923 | A1 | 5/2014 | Jones et al. |
| 2014/0164259 | A1 | 6/2014 | Hildreth et al. |
| 2014/0173530 | A1 | 6/2014 | Mesguich Havilio et al. |
| 2014/0207515 | A1 | 7/2014 | Merg et al. |
| 2014/0258304 | A1 | 9/2014 | Sabanski et al. |
| 2014/0277902 | A1 | 9/2014 | Koch |
| 2014/0282256 | A1 | 9/2014 | Fish et al. |
| 2015/0012169 | A1 | 1/2015 | Coard |
| 2015/0039176 | A1* | 2/2015 | Fish ..................... G06F 3/0482 701/31.6 |
| 2015/0082218 | A1 | 3/2015 | Affoneh et al. |
| 2015/0121275 | A1 | 4/2015 | Marshall et al. |
| 2015/0269176 | A1* | 9/2015 | Marantz ........... G06F 16/90324 707/767 |
| 2015/0324363 | A1 | 11/2015 | Merg |
| 2016/0026644 | A1 | 1/2016 | Schumann |
| 2016/0124586 | A1 | 5/2016 | Covington et al. |
| 2017/0132854 | A1 | 5/2017 | Merg et al. |
| 2018/0292957 | A1 | 10/2018 | Covington et al. |
| 2020/0241714 | A1 | 7/2020 | Covington et al. |

OTHER PUBLICATIONS

International Searching Authority, European Patent Office, International search report of the International searching authority for international application No. PCT/US2015/05307, dated of search report dated Dec. 23, 2015, 5 pages.

* cited by examiner

METHODS AND SYSTEMS FOR TAXONOMY ASSIST AT DATA ENTRY POINTS

REFERENCE TO RELATED APPLICATIONS

This application is a continuation application of U.S. patent application Ser. No. 16/852,652, filed on Apr. 20, 2020 and entitled "Methods and systems for taxonomy assist at data entry points." U.S. patent application Ser. No. 16/852,652 is a continuation application of U.S. patent application Ser. No. 16/006,175, filed on Jun. 12, 2018, entitled "Methods and systems for taxonomy assist at data entry points," and issued on Jul. 7, 2020 as U.S. Pat. No. 10,705,686. U.S. patent application Ser. No. 16/006,175 is a continuation application of U.S. patent application Ser. No. 14/529,135, filed on Oct. 30, 2014, entitled "Methods and systems for taxonomy assist at data entry points," and issued on Jul. 17, 2018 as U.S. Pat. No. 10,025,764. U.S. patent application Ser. No. 14/529,135, U.S. patent application Ser. No. 16/006,175, and U.S. patent application Ser. No. 16/852,652 are incorporated herein by reference.

BACKGROUND

Most vehicles are serviced at least once during their useful life. In many instances, a vehicle is serviced at a facility with professional mechanics (e.g., technicians). The technicians usually prepare or are provided with a repair order (RO) having details regarding the servicing or repair of a particular vehicle. One or more individuals, such as a service writer or the technician, can record the details onto the RO. Each individual decides which details to record onto the RO and which words make up those details. For any of a variety of reasons such as, but not limited to, a level of experience, a level of education, a time of day, or a geographical location, one or more individuals may use different words to explain similar details on different repair orders. Using different words to explain similar details on an RO or otherwise can be detrimental in certain respects such as, but not limited to, an amount of time required to process a completed RO or an amount of time required to evaluate completed repair orders to determine trends in servicing vehicles. Improvements pertaining to data entry can reduce such detriments.

OVERVIEW

Several example embodiments are described herein. In one respect, an example embodiment can take the form of a method comprising: (i) receiving, by a processor, a vehicle identifier associated with a vehicle, (ii) receiving, by the processor, a first text entry entered within a text field displayed by a display, (iii) determining, by the processor, one or more complete-text terms, wherein each of the one or more complete-text terms is associated with the vehicle identifier and the first text entry, and wherein each of the one or more complete-text terms includes at least one more text character than the first text entry, (iv) displaying, by the display, the one or more complete-text terms prior to selection of a complete-text term from among the one or more complete-text terms, (v) receiving, by the processor, a selection of a first complete-text term from among the one or more complete-text terms displayed by the device, and (vi) displaying, by the display, the first selected complete-text term within the text field.

In another respect, an example embodiment can take the form of a system comprising: a user interface including a display, a processor, and a computer-readable medium storing computer-readable program instructions executable by the processor to perform a set of functions, the set of functions comprising: (i) receiving, by the processor, a vehicle identifier associated with a vehicle, (ii) receiving, by the processor, a first text entry entered within a text field displayed by a display, (iii) determining, by the processor, one or more complete-text terms, wherein each of the one or more complete-text terms is associated with the vehicle identifier and the first text entry, and wherein each of the one or more complete-text terms includes at least one more text character than the first text entry, (iv) displaying, by the display, the one or more complete-text terms prior to selection of a complete-text term from among the one or more complete-text terms, (v) receiving, by the processor, a selection of a first complete-text term from among the one or more complete-text terms displayed by the device; and (vi) displaying, by the display, the first selected complete-text term within the text field.

In another respect, an example embodiment can take the form of a computer-readable medium storing program instructions, that when executed by a processor, cause a set of functions to be performed, the set of functions comprising: (i) receiving, by a processor, a vehicle identifier associated with a vehicle, (ii) receiving, by the processor, a first text entry entered within a text field displayed by a display, (iii) determining, by the processor, one or more complete-text terms, wherein each of the one or more complete-text terms is associated with the vehicle identifier and the first text entry, and wherein each of the one or more complete-text terms includes at least one more text character than the first text entry, (iv) displaying, by the display, the one or more complete-text terms prior to selection of a complete-text term from among the one or more complete-text terms, (v) receiving, by the processor, a selection of a first complete-text term from among the one or more complete-text terms displayed by the device, and (vi) displaying, by the display, the first selected complete-text term within the text field.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

DETAILED DESCRIPTION

I. Introduction

This description describes several example embodiments including, but not limited to, example embodiments that pertain to determining and displaying complete-text terms as text characters are entered into a text field. A complete-text term (CTT) can be determined based on (e.g., conditioned on) any of a variety of complete-text term selection-limiters. Entry of the complete-text terms can provide for more consistent term entry carried out by one or more individuals, which can reduce the amount of time and computing resources required to perform post-processing of data including the complete-text terms, but the example embodiments are not so limited. Entry of complete-text terms onto an RO can provide more efficient use of data storage to store computer-readable RO as the complete-text terms can include abbreviations that are shorter than text an individual may otherwise select, but the example embodiments are not so limited.

In this description, the articles "a," "an" or "the" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

The diagrams, flow charts, and other data shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (e.g., machines, interfaces, functions, orders, or groupings of functions) can be used instead. Furthermore, various functions described as being performed by one or more elements can be carried out by a processor executing computer-readable program instructions (CRPI) or by any combination of hardware, firmware, or software.

II. Example Systems

Figure 1:
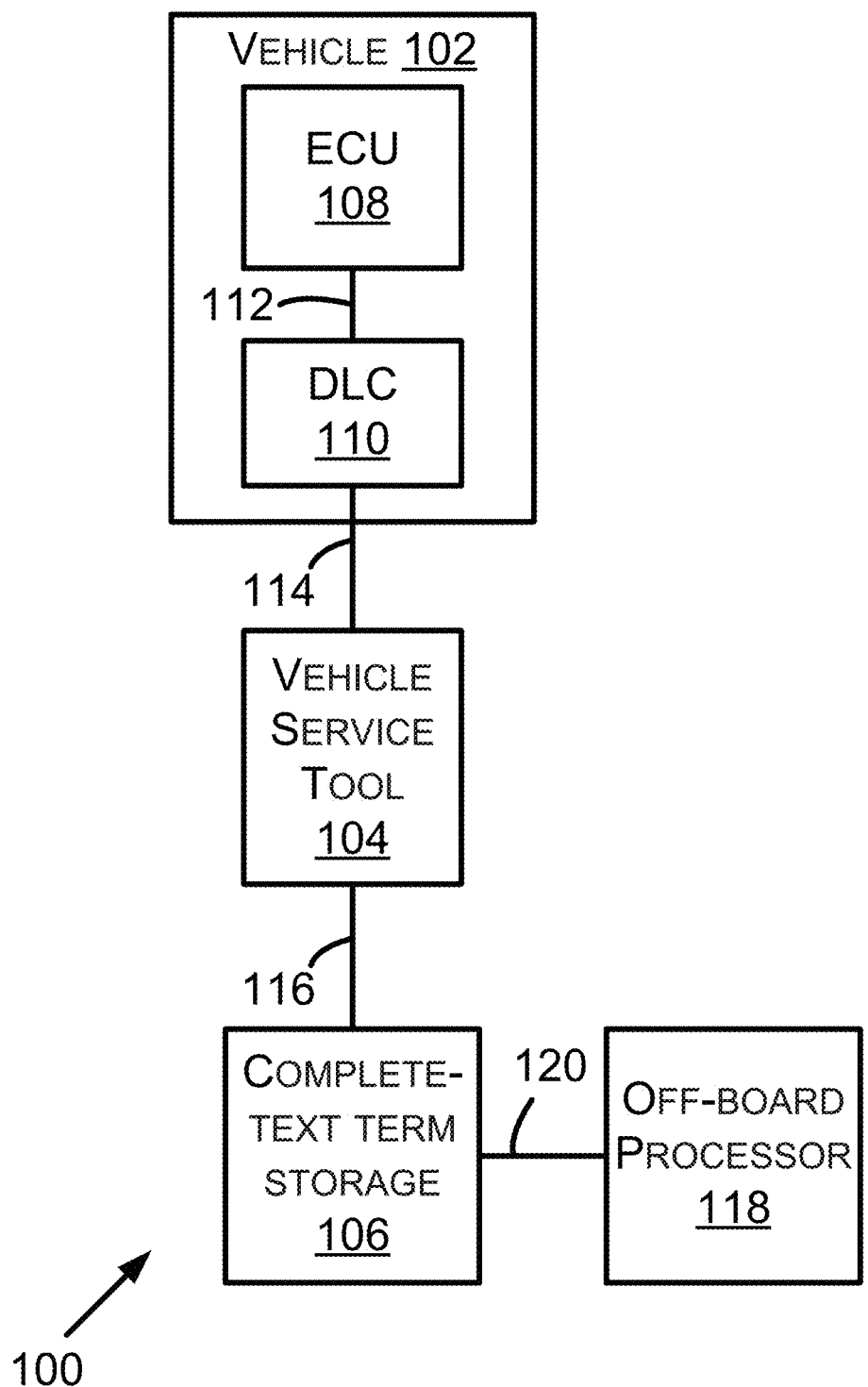
FIG. 1 is a block diagram of a system in accordance with the example embodiments.

FIG. 1 is a block diagram of a system 100 in accordance with the example embodiments described herein. The system 100 includes a vehicle 102 having an electronic control unit (ECU) 108 and a data link connector (DLC) 110. The ECU 108 and the DLC 110 can be communicatively connected to one another by a vehicle communication link 112.

A vehicle, such as vehicle 102, can include an automobile, a motorcycle, a light-duty truck, a medium-duty truck, a heavy-duty truck, a semi-tractor, a farm machine, or some other equipment that can be driven or otherwise guided along a path (e.g., a paved road or otherwise) on land, in water, or in the air or outer space. A vehicle can include or use any appropriate voltage or current source, such as a battery, an alternator, a fuel cell, and the like, providing any appropriate current or voltage, such as about 12 volts, about 42 volts, and the like. A vehicle can include or use any desired system or engine. Those systems or engines can include items that use fossil fuels, such as gasoline, natural gas, propane, and the like, electricity, such as that generated by a battery, magneto, fuel cell, solar cell and the like, wind and hybrids or combinations thereof.

The vehicle communication link 112 can include one or more conductors (wired or otherwise) or can be wireless. As an example, the vehicle communication link 112 can include one or two conductors for carrying vehicle data messages in accordance with a vehicle data message (VDM) protocol. A VDM protocol can include, but is not limited to, a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, or an ISO 14230-4 KWP2000 K-Line VDM protocol.

The DLC 110 can include an on-board diagnostics (OBD) II connector. An OBD II connector can include slots for retaining up to 16 connector terminals, but the DLC 110 is not so limited. The DLC 110 can include conductor terminals that connect to a conductor in the vehicle 102. For instance, the DLC 110 can include connector terminals that connect to conductors that respectively connect to positive and negative terminals of a vehicle battery. The DLC 110 can include one or more conductor terminals that connect to a conductor of the vehicle communication link 112 such that the DLC 110 is communicatively connected to the ECU 108.

The ECU 108 can control various aspects of vehicle operation or components within the vehicle 102. For example, the ECU 108 can include a powertrain system ECU, an engine ECU, a supplemental inflatable restraint system (i.e., an air bag system) ECU, an entertainment system ECU, or some other ECU. The ECU 108 can receive inputs (e.g., a sensor input), control output devices (e.g., a solenoid), generate a vehicle data message (VDM) (such as a VDM based on a received input or a controlled output), and set a diagnostic trouble code (DTC) as being active or history for a detected fault or failure condition within the vehicle 102.

Two or more ECU, such as the ECU 108 and a second ECU in the vehicle 102, can send a VDM to each other and receive a VDM from the other ECU. Transmission of a VDM can occur over the vehicle communication link 112. In that way, a VDM can be transmitted to the DLC 110. A VDM can include a vehicle identifier or one or more vehicle identifier elements associated with the vehicle 102. A VDM can include a use indicator associated with the vehicle 102. A VDM can include a DTC identifier pertaining to a DTC set active or otherwise in the vehicle 102 by the ECU 108. A VDM can include a geographic location indicator associated with the vehicle 102. A VDM can include one or more vehicle parameters and a vehicle parameter identifier (i.e., a vehicle PID). A VDM can include two or more of items described in the prior VDM examples or can include other data.

The system 100 includes a vehicle service tool (VST) 104 and a complete-text term (CTT) storage device 106. The VST 104 and the CTT storage device 106 can be communicatively connected to one another by a communication link 116. The VST 104 can be communicatively connected to the vehicle 102 (e.g., to the DLC 110 within the vehicle 102) by way of a communication link 114. The VST 104 can operate using electrical power provided to it from the vehicle battery by way of the DLC 110, but the VST 104 is not so limited. The communication link 114 can include one or more conductors (wired or otherwise) or can be wireless. The communication link 114 can include a harness with one or more conductors and a connector that connects to a mating connector on the VST 104 and to the wires within the harness, but the communication link 114 is not so limited.

The harness and mating connectors can be configured like a DB-25 connector, but are not so limited.

In accordance with examples in which a communication link, such as communication link 114 or any other communication means described herein, communicates data wirelessly, such wireless communication of data can be carried out in accordance with a wireless communication protocol (e.g., a wireless communication standard). As an example, a wireless communication protocol can be an Institute of Electrical and Electronics Engineers (IEEE) 802.15.1 standard for wireless personal area networks (PANs) or a Bluetooth version 4.1 standard developed by the Bluetooth Special Interest Group (SIG) of Kirkland, Wash. As another example, the wireless communication protocol can be an IEEE 802.11 standard for wireless LANs, which is sometimes referred to as a Wi-Fi standard. As another example, the wireless communication protocol can be a cellular phone standard, such as standard for 3G or 4G cellular phone communications developed by the $3^{rd}$ Generation Partnership Project (3GPP). Other examples of a wireless communication protocol are also possible.

The CTT storage device 106 can include a computer-readable medium storing complete-text terms and associated metadata for locating particular complete-text terms within the CTT storage device 106. As an example, the metadata can include vehicle identifiers or vehicle identifier elements pertaining to one or more vehicles, or one or more CTT selection-limiters pertaining to one or more vehicles. Associating vehicle identifiers for multiple vehicle types with a CTT allows for vehicle leveraging functions (as described later herein) with respect to that CTT and the multiple vehicle types.

The CTT storage device 106 can include a single computer-readable medium or can include multiple distributed computer-readable mediums. A computer-readable medium of the CTT storage device 106 can be collocated with the VST 104 or located off-board the VST 104. A computer-readable medium of the CTT storage device 106 can be collocated with an off-board processor 118 or located off-board the off-board processor 118.

The system 100 also includes the off-board processor 118, which is communicatively connected to the complete-text term storage 106 by a communication link 120. The off-board processor 118 is off-board (e.g., remote from) the vehicle 102 and is off-board the VST 104. The off-board processor 118 can be configured as, or can be a part of, a server device (not shown) or some other computing device (not shown). The off-board processor 118 can be operated or maintained by an entity that receives, stores, and processes service data (e.g., repair orders from repair shops).

In accordance with examples in which at least a portion of the CTT storage device 106 is co-located with or proximate to the off-board processor 118 (e.g., on a common circuit board or within a common housing), the communication link 120 can include a data bus or electrical circuit within a server device or other computing device that includes the CTT storage device 106 and the off-board processor 118, but is not so limited. In accordance with examples in which at least a portion of the CTT storage device 106 is remote from the off-board processor 118 or a server device or other computing device including the off-board processor 118, the communication link 120 can comprise a private or public communications network such as a local area network, a cellular communication network, or the Internet, but is not so limited.

Figure 2:
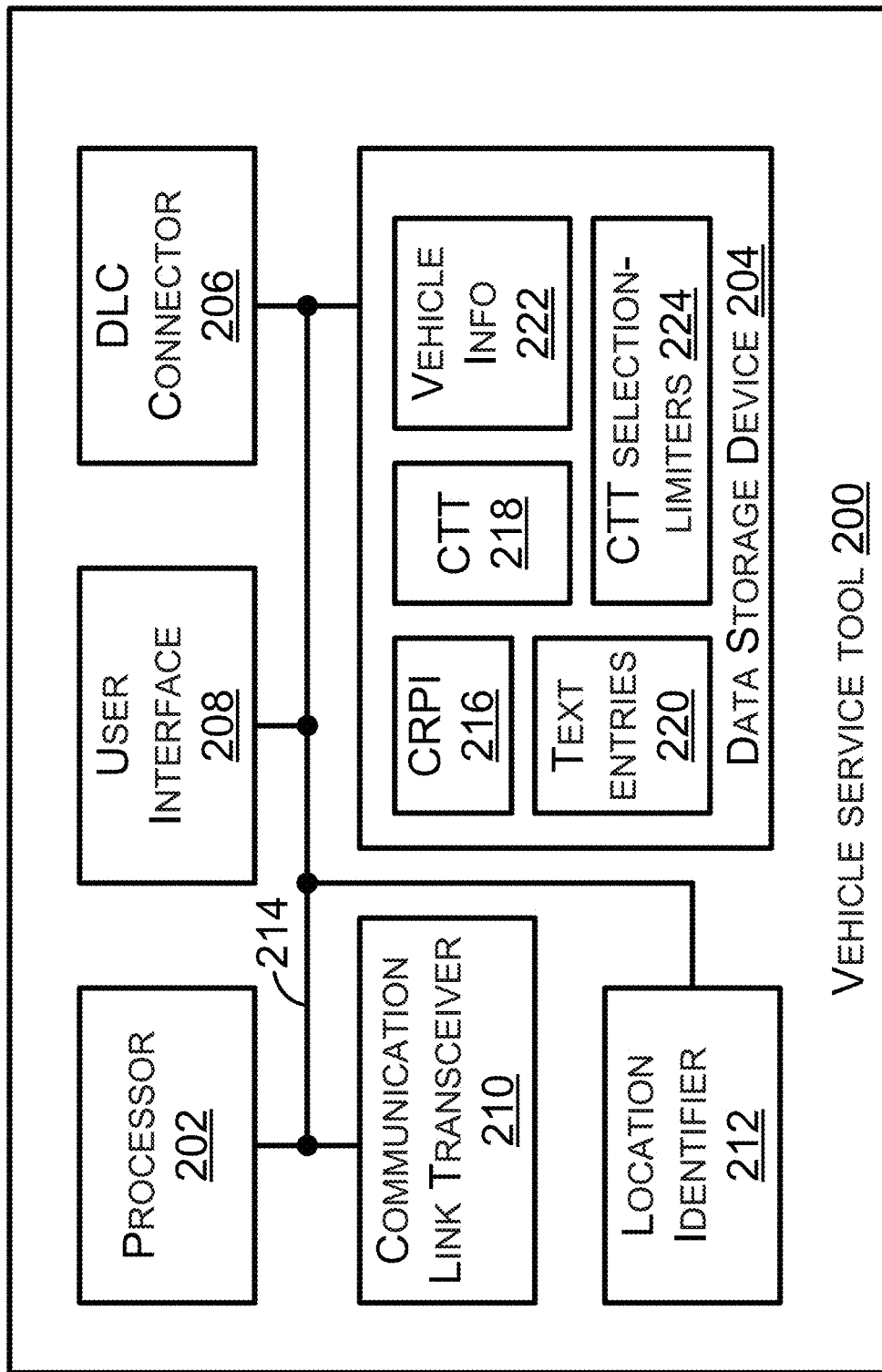
FIG. 2 is a block diagram of a vehicle service tool (VST) in accordance with the example embodiments.

Next, FIG. 2 is a block diagram of a vehicle service tool (VST) 200 in accordance with the example embodiments described herein. The VST 200 can operate within the system 100 in place of, or in addition to, the VST 104, but is not so limited. The VST 104 can be arranged like the VST 200. The VST 104 can include the VST 200 or any one or more of the components thereof. One or more of the components of the VST 200 can be arranged as a device or system. A device or system can include one or more of the components of the VST 200.

The VST 200 includes a processor 202, a data storage device 204, a DLC connector 206, a user interface 208, a communication link transceiver 210, and a location identifier 212, two or more of which can be communicatively coupled or linked together via a system bus, network, or other connection mechanism 214.

A processor, such as processor 202 or any other processor discussed in this description, can include one or more general purpose processors (e.g., INTEL® single core microprocessors or INTEL® multicore microprocessors) or one or more special purpose processors (e.g., digital signal processors). Additionally or alternatively, a processor can include an application specific integrated circuit (ASIC). Processor 202 can be configured to execute computer-readable program instructions (CRPI), such as the CRPI 216 shown in FIG. 2.

A data storage device, such as data storage device 204 or any other data storage device discussed in this description, can include a computer-readable medium. A computer-readable medium can include a non-transitory computer-readable medium readable by a processor. A computer-readable medium can include volatile or non-volatile storage components, such as optical, magnetic, organic or other memory or disc storage, which can be integrated in whole or in part with a processor, or which can be separate from a processor. A computer readable medium can include, but is not limited to, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or any other device that is capable of providing data or executable instructions that may be accessed by a processor, such as processor 202.

Additionally or alternatively, a computer-readable medium can include a transitory computer-readable medium. The transitory computer-readable medium can include, but is not limited to, a communications medium such as a digital or analog communications medium (e.g., a fiber optic cable, a waveguide, a wired communication link, or a wireless communication link).

A computer-readable medium can be referred to by other terms such as, but not limited to, a "computer-readable storage medium," a "data storage device," a "memory device," or a "memory." Data storage device 204 can be referred to as a "computer-readable data storage device" and a "computer-readable medium."

The DLC connector 206 can communicatively connect the VST 200 to the vehicle 102. This communicative connection allows the VST 200 to transmit messages (e.g., a VDM request) to the vehicle 102, and to receive messages (e.g., VDM) from the vehicle 102. In one respect, the communicative connection can be carried out using wired conductors of the communication link 114. For instance, the DLC connector 206 can include a connector with terminals that are connectable to terminals within the DLC 110 by way of one or more conductors. As an example, the DLC connector 206 can include an OBD II connector that meets the SAE J1962 specification such as a connector 16M, part number 12110252, available from Delphi Automotive LLP of Troy, Mich. In another respect, the communicative connection between the VST 200 and the vehicle 102 can be carried out using a wireless connection of the communication link 114. For instance, the DLC connector 206 can include a wireless transceiver to transmit VDM to and receive VDM from a version of the DLC 110 configured for wireless communication of VDM. The DLC connector 206 can transmit a VDM it receives to one or more of the processor 202, the data storage device 204, the user interface 208, and the communication link transceiver 210 over the connection mechanism 214.

The user interface 208 can include user-input elements configured so that a user of VST 200 can input data for use by the processor 202 or another element of the VST 200. As an example, the user-input elements can include a touch screen display. As another example, the user-input elements can include a user input section (e.g., the user input section 304 shown in FIG. 3) having one or more input keys. As another example, the user-input elements can include a pointing device such as a computing device mouse, a keyboard (e.g., a QWERTY keyboard), a display pointer (e.g. the display pointer 314 shown in FIG. 3), or a microphone for receiving spoken inputs.

The user interface 208 can include user-output elements configured for outputting (e.g., presenting) data to a user of the VST 200. As an example, the user-output elements can include a display device (or more simply, a "display") for visual presentation of data, such as text fields, text entries, drop-down meus, vehicle identifiers, or CTT selection-limiters. As another example, the user-output elements can include an audio speaker to audibly present data to a user of the VST 200. As an example, the audible data can include sounds (e.g., sound waves of a constant frequency) to alert a user to various warnings and prompts associated with use of the VST 200. As another example, the audible data can include text-to-speech content of at least a portion of data displayed by the display.

The communication link transceiver 210 can include one or more transceivers. In one respect, the one or more transceivers can include a wireless transceiver and one or more antennas to carry out wireless communications according to a wireless communication protocol. In another respect, the one or more transceivers can include a wired transceiver to carry out communications over a wired communication link in accordance with a communication protocol such as, but not limited to, an Transmission Control Protocol/Internet Protocol (TCP/IP) or an IEEE 802.3 Ethernet communication protocol for a LAN or otherwise. The communication link transceiver 210 can establish a communicative connection between the CTT storage device 106 or the off-board processor 120, but is not so limited.

As an example, the communication link transceiver 210 can transmit a request for a full set of complete-text terms based on a vehicle identifier or one or more CTT selection-limiters (e.g., a first vehicle identifier (e.g., Chevrolet Corvette), a first CTT selection-limiter (DTC P0115), and a second CTT selection-limiter (e.g., distance: 75,000 miles). The communication link transceiver 210 can receive a full set of complete-text terms from the CTT storage device 106 or the off-board processor 120. The VST 200 can store a full set of complete-text terms within the CTT 218 of the data storage device 204. As a result of receiving a full set of complete-text terms, the VST 200 can search the full set of complete-text terms to determine a partial set of complete-text terms that should be displayed after an occurrence of a text entry by the user interface 208. If a change in one or more of the vehicle identifier or a CTT selection-limiter occurs, the VST 200 can request a different full set of complete-text terms based on the changed vehicle identifier or the CTT selection-limiter.

As another example, the communication link transceiver 210 can transmit a request for a partial set of complete-text terms based on the vehicle identifier, one or more CTT selection-limiters (if any entered), prior text entries (if any entered), and a most-recent text entry entered by the user interface 208. Transmission of a partial set of complete-text terms over a communication link to the communication link transceiver 210 can typically occur in less time and use less communication link resources than transmission of a full set of complete-text terms over the same communication link.

The location identifier 212 can include a device for determining a location associated with the vehicle 102 or the VST 200. As an example, the location identifier 212 can include a global positioning system (GPS) receiver and related circuitry for receiving signals from GPS satellites or a terrestrial station. The GPS receiver can determine a location (e.g., a latitude, a longitude, and an elevation) based, at least in part, on the signals it receives. Alternatively, the GPS receiver can provide signals to the processor 202 so that the processor 202 can determine the location. As another example, the location identifier 212 can determine the location based on a VDM received at the DLC connector 206 from the vehicle 102. In accordance with that example, the location identifier 212 can include a computer-readable module executable by the processor 202.

A determined location can be used as a complete-text term selection-limiter. As an example, the determined location can be Ann Arbor, Mich. The complete-text term storage device 106 can include CTT associated with metadata indicating a location or geographic region including multiple locations. The determined location can be used as a CTT selection-limiter such that a set of CTT provided to the VST 200 include the CTT associated with the determined location or a geographic location including the determined location and excludes the CTT that are not associated with the determined location or the geographic location including the determined location. A determined location can be used for one or more other purposes.

The data storage device 204 can store various data. For example, the data storage device 204 can store the CRPI 216, the complete-text terms 218, text entries 220, vehicle information 222, and CTT selection-limiters 224, but the data storage device 204 is not so limited.

In general, the CRPI 216, or any other CRPI described herein, include program instructions executable by a processor. Further, and in general, CRPI can include various structures, modules, or routines, but are not so limited. Further, and in general, CRPI can be written using a computer-programming language such as C++, but are not so limited.

In particular, the CRPI 216 can include program instructions executable by the processor 202 to carry out any one or more functions described herein or represented by the figures as being performed, at least in part, by a VST or a component thereof. The CRPI 216 can be executed to perform any function described herein or shown or represented in any figure as being performed by a VST or a component thereof.

The CTT 218 can include one or more sets of complete-text terms. In one respect, the CTT 218 can include a full set of CTT that is based on, at least in part, a vehicle identifier. A full set of CTT can further be based on one or more CTT selection-limiters. The VST 200 can use a full set of CTT for entering text into a text entry field without having to request a different set of CTT from the CTT storage device 106 until there is a change in the vehicle identifier or a CTT selection limiter entered by the user interface 208. The processor 202 can execute program instructions of the CRPI 216 to cause a full set of CTT, or some portion thereof, to be deleted from the CTT 218. For example, the processor 202 can execute those program instructions in response to the VST 200 requesting another set (full or partial) of CTT, upon receiving another set (full or partial) of CTT, or for some other reason.

In another respect, the CTT 218 can include a partial set of CTT based on, at least in part, a vehicle identifier and at least one text entry within a text field. The at least one text entry can be a single text entry (e.g., the most-recent text entry). Alternatively, the at least one text entry can be multiple text entries (e.g., the most-recent text entry and at least one prior text entry received prior to the most-recent text entry). The partial set of CTT can be further based on one or more CTT selection limiters. A full set of CTT can include multiple partial sets of CTT.

The text entries 220 can include text entries entered by the user interface 208. The text entries 220 can include a text entry within a text field for a particular text category. The text category can include, but is not limited to, a symptom category, a test performed category, a part failure category, a labor operation category, or a miscellaneous note category. The text category can be displayed by the user interface 208 (e.g., the text category 332 shown in FIG. 3). The text entries for multiple categories can be associated with a single repair order. For instance, each text entry for a particular RO can be tagged with an RO number that is associated with the particular RO.

A text entry field can be displayed by the user interface 208 and selected for entering a text entry. A text entry field can be initially empty. A first entry in a text entry field pertaining to a part failure category could be the letter "E." Table 1 shows an example of a series of text entries starting with the letter "E" until the letter "D" in the word "PAD." Table 1 also shows an example of complete-text terms that can be selected for the text entry field after the identified text entries have been entered. Starting from the initial text entry "E" in Table 1, as additional text entries are entered by the user interface 208, the number of selectable CTT is or are (i) the same as the those available for a prior text entry, (ii) reduced if the most-recent text entry eliminates at least one earlier-displayed selectable CTT, or (iii) increased if the most-recent text entry results in a term that does not match any of the earlier-displayed selectable CTT. To speed up the text entry process, a user can select a displayed complete-text term using the user interface 208 without having to enter each text term of the complete-text term.

TABLE 1

| Text entries | Complete-text terms (CTT) |
|---|---|
| E | EGR valve, Emergency brake, Emergency brake light, Emergency brake pedal, Emission valve, Engine, Engine block, Exhaust pipe, Exhaust gas recirculation valve |
| EM | Emergency brake, Emergency brake light, Emergency brake pedal, Emission valve |
| EME | Emergency brake, Emergency brake light, Emergency brake pedal |
| EMER | Emergency brake, Emergency brake light, Emergency brake pedal |
| EMERG | Emergency brake, Emergency brake light, Emergency brake pedal |
| EMERGE | Emergency brake, Emergency brake light, Emergency brake pedal |
| EMERGEN | Emergency brake, Emergency brake light, Emergency brake pedal |
| EMERGENC | Emergency brake, Emergency brake light, Emergency brake pedal |
| EMERGENCY | Emergency brake, Emergency brake light, Emergency brake pedal |
| EMERGENCY B | Emergency brake, Emergency brake light, Emergency brake pedal |
| EMERGENCY BR | Emergency brake, Emergency brake light, Emergency brake pedal |
| EMERGENCY BRA | Emergency brake, Emergency brake light, Emergency brake pedal |
| EMERGENCY BRAK | Emergency brake, Emergency brake light, Emergency brake pedal |
| EMERGENCY BRAKE | Emergency brake, Emergency brake light, Emergency brake pedal |
| EMERGENCY BRAKE P | Emergency brake pedal |
| EMERGENCY BRAKE PE | Emergency brake pedal |
| EMERGENCY BRAKE PED | Emergency brake pedal |
| EMERGENCY BRAKE PEDA | Emergency brake pedal |
| EMERGENCY BRAKE PEDAL | Emergency brake pedal |
| EMERGENCY BRAKE PEDAL P | Emergency brake pedal p |
| EMERGENCY BRAKE PEDAL PA | Emergency brake pedal pa |
| EMERGENCY BRAKE PEDAL PAD | Emergency brake pedal pad |

In accordance with the data shown in Table 1, the CTT 218 may not initially include a CTT that matches a desired text term to be entered. As shown in Table 1, the desired term to be entered is "Emergency brake pedal pad." A desired term that is not within the CTT 218 can be a new CTT. The processor 202 can cause a new CTT to be entered into the CTT 218. The processor 202 can execute program instructions of the CRPI 216 to transmit a new CTT to the CTT storage device 106 or to the off-board processor 118 for modifying one or more partial or full set of complete-text terms to include the new CTT. A vehicle identifier with or without one or more CTT selection-limiters can be transmitted with the new CTT for storage as metadata associated with the new CTT.

In accordance with the data shown in Table 1, row 3, a text entry of "M" is within a sequence of multiple text entries (i.e., "E" and "M"). Prior to receiving the text entry "M," the CTT included EGR valve, Engine, Engine block, Exhaust pipe, and Exhaust gas recirculation valve. After receiving the text entry "M," the CTT no longer include EGR valve, Engine, Engine block, Exhaust pipe, and Exhaust gas recirculation valve as the "M" does not match the second letter of any of those CTT.

The vehicle information 222 can include one or more vehicle identifiers. Each vehicle identifier can include a plurality of vehicle identifier elements. Each vehicle identifier can pertain to a particular vehicle or to a vehicle type (i.e., a type of vehicle). The particular vehicle can include a current vehicle of interest, such as a vehicle connected to the VST 200 or a vehicle for which an RO is to be prepared. The particular vehicle type can identify the vehicle type that pertains to the current vehicle of interest. The vehicle identifier elements can include one or more vehicle identifier elements such as, but not limited to, a vehicle model name, a vehicle make, a vehicle model year, an engine type, a system type, a vehicle identification number (VIN), or a portion of a VIN. The vehicle identifier elements pertaining to model year, make, model name, and engine type can be abbreviated as Y/M/M/E, and if system type is added, the abbreviation becomes Y/M/M/E/S. One or more of the vehicle identifier elements can include a regular production option (RPO) code or an optional equipment code. The vehicle information can include vehicle identifier elements that can be displayed by and selected by use of the user interface 208 to establish a vehicle identifier of the current vehicle of interest.

The vehicle information 222 can include one or more vehicle identifier elements entered by the user interface 208, but are not so limited. The vehicle information 222 can include one or more vehicle identifier elements that the processor 202 determines from a VDM received at the DLC connector 206 from the vehicle 102. That VDM, for example, can include a VIN associated with the vehicle 102. A VIN can include alphanumeric characters, but is not so limited.

The CTT selection-limiters 224 include limiters (e.g., characteristics) that can be selected, or otherwise entered, to limit which complete-text terms are provided to the VST 200 and subsequently displayed by the user interface 208 for selection to complete a text entry. The CTT selection-limiters 224 can be selected by the user interface 208 or can be determined automatically from a VDM received by the DLC connector 206, but are not so limited.

As an example, the CTT selection-limiters 224 can include a use indicator that indicates a time associated with a vehicle or a distance associated with the vehicle. The time associated with the vehicle can indicate an amount of a time an engine within the vehicle has been used since a prior instance of service to that engine, but the time is not so limited. The distance associated with the vehicle can indicate a number of miles (or kilometers) that the vehicle has been driven since the vehicle was built, but the distance is not so limited. A use indicator can be used to exclude providing or displaying CTT that are not associated with the use indicator. For instance, if the vehicle 102 has been driven 75,000 miles, CTT associated with a use indicator of 100,000 miles or more can be excluded from providing or displaying by the VST 200.

As another example, the CTT selection-limiters 224 can include a diagnostic trouble code identifier. A DTC identifier can indicate which ECU or system within the vehicle 102 set the DTC, a current state of the DTC (e.g., active or history), and a DTC designator, such as P0115. A DTC identifier can be used to exclude providing or displaying CTT that are not associated with the DTC identifier.

As another example, the CTT selection-limiters 224 can include a geographic location indicator. A geographical location indicator can indicate a location identified by use of the location identifier 212. A geographical location indicator can indicate a location of the VST 200 or a location associated with the vehicle 102. A location associated with the vehicle can indicate a location at which the vehicle 102 is currently located, a most-recent determined location of the vehicle, a location at which the vehicle was manufactured, a location at which an owner of the vehicle resides, or some other location associated with the vehicle 102. A geographic location indicator can be used to exclude providing or displaying CTT that are not associated with the geographic location indicator.

As another example, the CTT selection-limiters 224 can include a plurality of text category indicators. The plurality of text category indicators can include a text category such as, but not limited to, a symptom category, a test performed category, a part failure category, a labor operation category, or a miscellaneous note category. One of the text category indicators can represent a current text category. The current text category can be determined automatically in response to selecting a text field associated with the current text category by a display pointer or otherwise, or in response to entering text into a current text field. A text category indicator can be used to exclude providing or displaying CTT that are not associated with a current text category. For example, if the current text category is a symptom category, a CTT associated with a part failure category that is not associated with a symptom category can be excluded from displaying or providing to the VST until the part failure category is a current text category.

Figure 3:
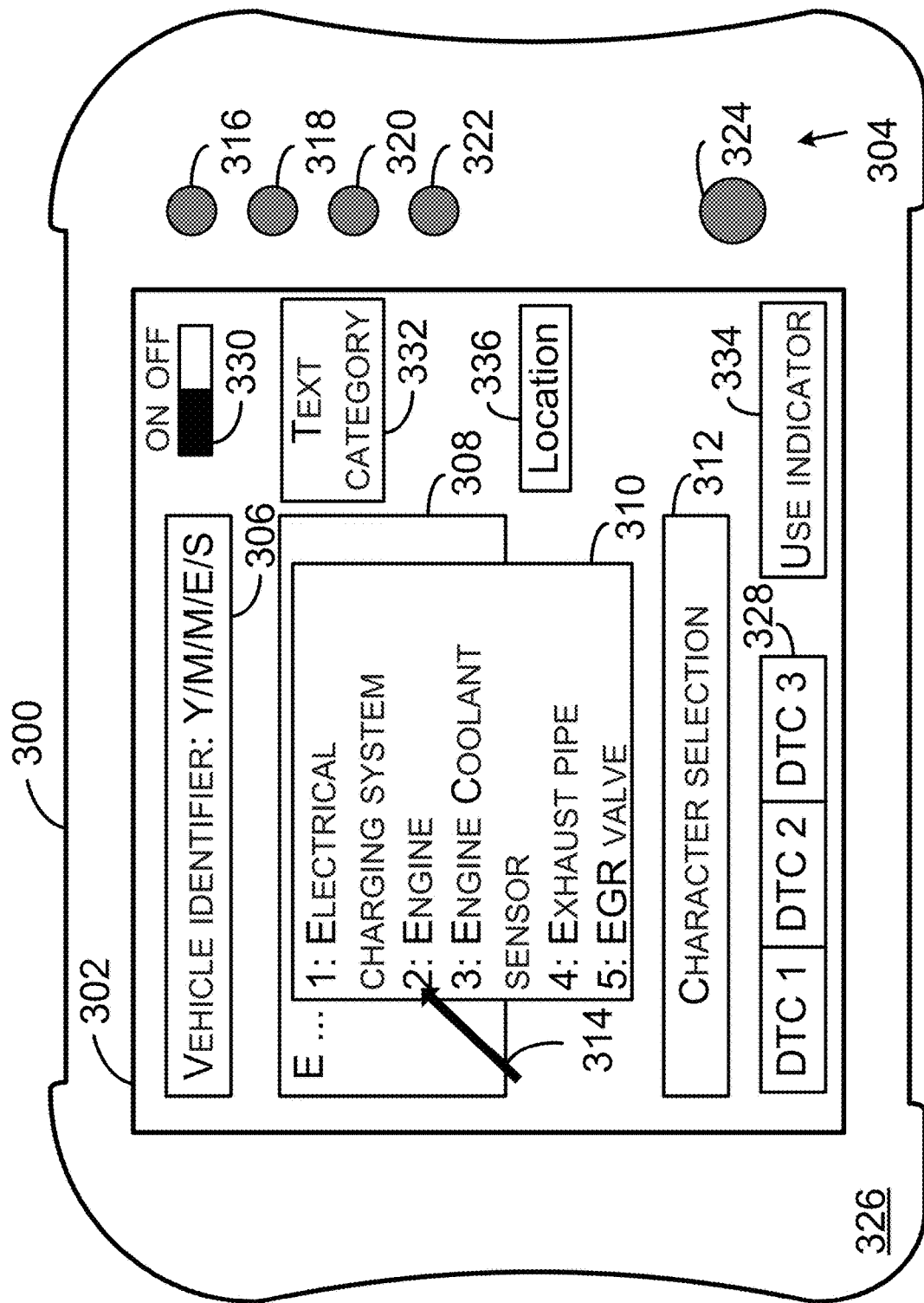
FIG. 3 is a diagram of a VST with a display in accordance with the example embodiments.
Figure 4:
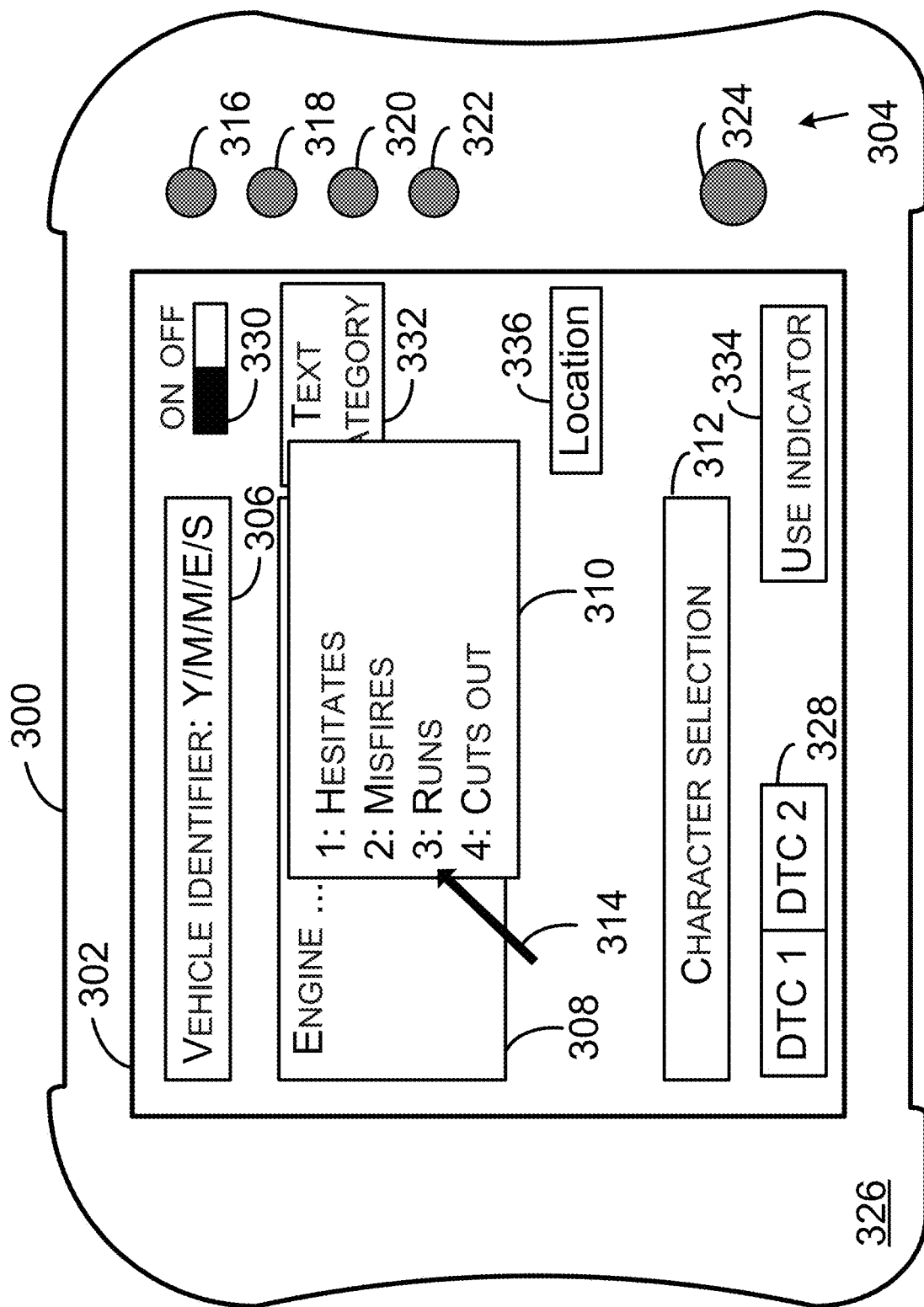
FIG. 4 is another diagram of the VST with a display in accordance with the example embodiments.
Figure 5:
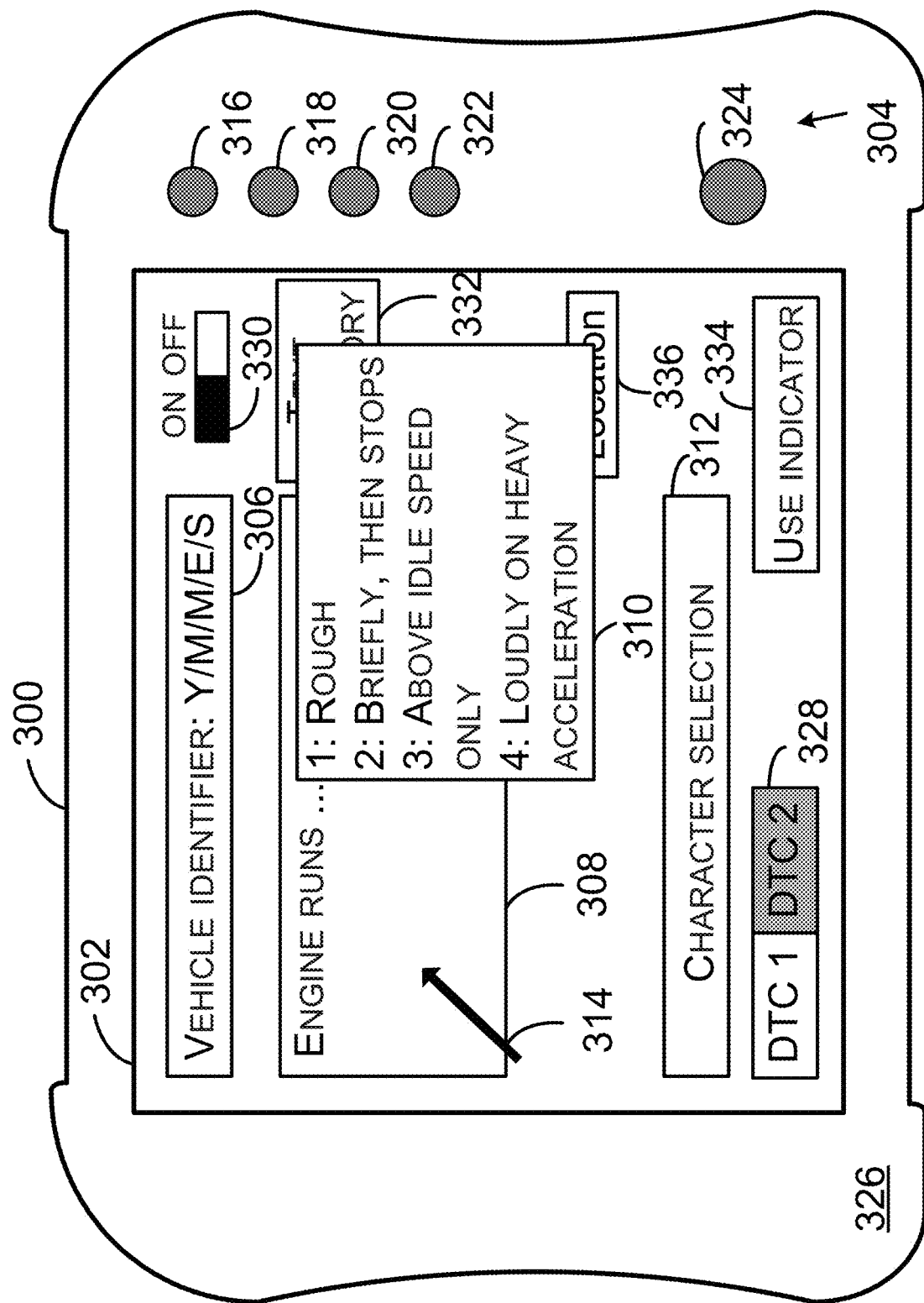
FIG. 5 is another diagram of the VST with a display in accordance with the example embodiments.

Next, FIG. 3, FIG. 4, and FIG. 5 are diagrams of an example vehicle service tool 300 in accordance with the example embodiments. VST 104 and VST 200 can include any one or more of the described or depicted features of the VST 300, but the VST 104 and the VST 200 are not so limited. The VST 300 can operate within the system 100 in place of, or in addition to, the VST 104 or the VST 200, but the VST 300 is not so limited.

The VST 300 includes a display 302, a user input section 304, and a housing 326. The display 302 and the user input section 304 can be a part of a user interface, such as the user interface 208. As an example, the display 302 can include a touch-screen display such as a color touch screen used on the MODIS™ ultra integrated diagnostic system (reference number EEMS328W) available from Snap-on Incorporated of Kenosha, Wis. As another example, the display 302 can include a backlit color liquid crystal display (LCD) having a resistive touch screen or panel. As another example, the display 302 can include a plasma display or a light emitting diode (LED) display. Other examples of the display 302 are also possible.

The user input section 304 can include one or more input selectors. For example, the user input section 304 can include input keys 316, 318, 320, 322, and 324. Those user input keys can be arranged in any of a variety of configurations. For instance, input key 316 can represent an up-direction selection, input key 318 can represent a right-direction selection, input key 320 can represent a down-direction selection, input key 322 can represent a left-direction selection, and input key 324 can represent an enter selection. Pressing one of the input keys 316, 318, 320, and 322 can cause a display pointer 314 to move in a direction represented by the input key being pressed. Pressing the input key 324 can cause selection of a displayed data element to which the display pointer 314 is pointing.

The display 302 can display (e.g., present visually) a variety of data elements and data within each of those data elements. For purposes of this description, a data element can include or be referred to as a "text field" or more simply a "field." Visually presenting a data element can be referred to as displaying the data element by, on, at, or within the display 302, but is not so limited. As an example, the display 302 can display a vehicle identifier (ID) field 306, a text field 308, a complete-text term field 310, a character selection field 312, a DTC identifier field 328, a vehicle leveraging indicator 330, a text category indicator 332, a use indicator 334, and a location indicator 336. Other examples of the data elements displayable or visually presentable by the display 302 are also possible.

The vehicle ID field 306 can display an identifier of a particular vehicle type or an identifier of a particular instance of a particular vehicle. As an example, the identifier displayed by the vehicle ID field 306 can indicate a Y/M/M/E/S of a vehicle type, such as a 2014 (Year), General Motors (Make), Cadillac Escalade (Model), 6.2 L V8 (Engine) and all-wheel drive system (System). The vehicle leveraging indicator 330 indicates whether a vehicle leveraging feature is turned on (e.g., enabled) or turned off (e.g., disabled).

In one respect, when the vehicle leveraging feature is turned on, upon entry or selection of a vehicle identifier for the vehicle ID field 306, vehicles similar to the vehicle or vehicle type indicated by the vehicle ID field 306 can be included within the vehicle ID field 306 or the data selectable by one or more other fields shown on the display 302 can include additional data associated with the similar vehicles even though the additional data may not be associated with the vehicle or the vehicle type upon which the vehicle leveraging feature is based to determine the similar vehicle(s). Vehicle leveraging can also result in excluding data if the data is not associated with all common vehicle types for which the vehicle leveraging is carried out.

As an example, when the vehicle ID field 306 initially indicates the Cadillac Escalade model and the vehicle leveraging feature is turned on, the vehicle ID field 306 can subsequently display a vehicle identifier for a Chevrolet Tahoe and a GMC Yukon. If the vehicle leveraging feature is turned off while displaying vehicle identifiers for an initially entered vehicle identifier and one or more similar vehicles, the vehicle ID field 306 can responsively display the initially entered vehicle identifier without the vehicle identifiers of the similar vehicles. The additional data associated with the similar vehicles, but not associated with vehicles associated with the initial vehicle identifier would not be displayed as being selectable by the one or more fields shown on the display 302.

The text field 308 can display text (e.g., alphabet letters, numerals, non-alphabetic-and-non-numeral characters, or complete-text terms). The displayed text can be displayed in response to entering or selecting the text from the complete-text term field 310 or the character selection field 312. The text displayed in the text field 308 can be stored within the text entries 220 as the text is being entered into text field 308 (e.g., a partial text entry storage) or after the complete text to be entered in the text field 308 has been entered (e.g., a complete text entry storage). The text field 308 is an example of a data entry point displayable by the display 302. Other examples of data entry points for which a CTT can be determined, displayed and selected are also possible.

The complete-text term field 310 displays CTT that are selectable for entry into a text field, such as the text field 308. The user input section 304 can be used to guide the display pointer 314 to one of the displayed CTT for selection and entry into the text field. For example, the CTT number 2 "Engine" can be selected from the CTT field 310, as shown in FIG. 3, and displayed in the text field 308 as shown in FIG. 4 and FIG. 5. In FIG. 5, the text field 308 also displays the CTT "Runs." As shown in FIG. 4, the CTT "Runs" is displayed and selectable from the CTT field 310 after selection of the CTT "Engine."

The character selection field 312 can include a plurality of selectable characters. As an example, the selectable characters can include characters of an alphabet (e.g., a Latin alphabet), the numerals 0 to 9, or non-alphabetic-and-non-numeral characters found on a QWERTY keyboard. Other examples of selectable characters displayable by the character selection field 312 are also possible. One or more of the display pointer 314 and an input key of the user input section 304 can be used to select a character displayed by the character selection field 312. Selection of a character displayed by the character selection field 312 can be detected by the processor 202 and responsively inserted into the text field 308 or responsively cause (i) a selection of a complete-text term displayed by the complete-text term field 310, or (ii) a change to the mix of complete-text terms displayed by the complete-text term field. That change can include removal of complete-text terms whose first or next character do or does not match the selected character.

The DTC ID field 328 can indicate one or more DTC. The one or more DTC can be the DTC that are set within the vehicle 102, but are not so limited. The processor 202 can determine the one or more DTC from a VDM received at the DLC connector 206. The DTC ID field 328 can indicate whether each displayed DTC is an active DTC or is a historical DTC. In FIG. 3, the DTC ID field 328 identifies three DTC, namely DTC 1, DTC 2, and DTC 3. After selection of the complete-text term "Engine" from the complete-text term field 310 shown in FIG. 3, as shown in FIG. 4, the DTC ID field 328 continues to show DTC 1 and DTC 2, but not DTC 3. In such a case, DTC 3 may not be associated with the engine of vehicle 102. If a different CTT had been selected from the CTT field 310 as shown in FIG. 3, the DTC ID field 328 could display a set of DTC other than DTC 1 and DTC 2.

The DTC ID field 328 can indicate a choice of DTC identifiers to use as a CTT selection limiter. For example, as shown in FIG. 4, the DTC ID field 328 displays DTC 1 and DTC 2 are shown with white backgrounds to indicate that neither of those DTC identifiers has been selected as a CTT selection-limiter. As shown in FIG. 5, the DTC ID field 328 again displays DTC 1 and DTC 2, but the DTC 2 identifier is highlighted gray to indicate that DTC 2 has been selected as a selection-limiter. Selection of one or more DTC displayed by the DTC ID field 328 can change the CTT that are displayed by the CTT field 310.

The vehicle leveraging indicator 330 can indicate whether a vehicle leveraging mode (VLM) of the VST 200 is turned on or turned off. Turning the VLM on or off can occur automatically or manually. One or more of the display pointer 314 and an input key of the user input section 304 can be used to manually turn the VLM on or off. Switching the VLM from on-to-off or from off-to-on can cause the processor 202 to switch which data is displayed by the one or more of the vehicle ID field 306, the text field 308, the complete-text term field 310, and the DTC ID field 328.

As an example, in response to the VLM turning on, the vehicle ID field 306 can switch to display identifiers of two or more different vehicle types (e.g., Chevrolet Tahoe, Chevrolet Suburban, GMC Tahoe, GMC Suburban, and Cadillac Escalade) instead of a single vehicle type (e.g., Cadillac Escalade). In response to the VLM turning off, the vehicle ID field 306 can switch back to displaying a vehicle ID of a single vehicle type or a unique instance of the particular vehicle type instead of displaying the vehicle identifiers of two or more different vehicle types.

As another example, in response to the VLM turning on, the text field 308 can switch to display a different set of text terms (e.g., multiple vehicle identifiers of the two or more different vehicle types instead of a single vehicle identifier). In response to the VLM turning off, the text field 308 can switch to display a different set of text terms (e.g., a single vehicle identifier instead of the multiple vehicle identifiers of the two or more different vehicle types).

As another example, in response to the VLM turning on, the complete-text term field 310 can display a different quantity of complete-text terms, a different mix of complete-text terms, or two or more of the complete-text terms in a different order (e.g., sequence). The processor 302 can determine which complete-text terms are applicable to the two or more different vehicle types and cause the determined complete-text-terms to be displayed by the complete-text term field 310. In response to the VLM turning off, the processor 302 can determine which complete-text terms are applicable to the single vehicle type or a unique instance of the particular vehicle type and cause the determined complete-text-terms to be displayed by the complete-text term field 310.

As another example, in response to the VLM turning on, the DTC ID field 328 can display a different quantity of DTC identifiers, a different mix of DTC identifiers, or two or more of the DTC identifiers in a different order. The processor 302 can determine which DTC identifiers are applicable to the two or more different vehicle types and cause the determined DTC identifiers to be displayed by the DTC ID field 328. In response to the VLM turning off, the processor 302 can determine which DTC identifiers are applicable to the single vehicle type or a unique instance of the particular vehicle type and cause the determined DTC identifiers to be displayed by the DTC ID field 328.

The text category indicator 332 can indicate any of a variety of text categories associated with the text being entered into the text field 308. As an example, the indicated text category can include, but is not limited to, a symptom category, a test performed category, a part failure category, a labor operation category, or a miscellaneous note category. One or more of the display pointer 314 and an input key of the user input section 304 can be used to select the text category indicated by the text category indicator 332. Selecting a text category not currently displayed by the text category indicator 332 can trigger storing a text entry into the text entries 220 or to clear the text field 308 such that any text currently displayed in the text field 308 is removed from the text field 308.

The use indicator 334 can display a CTT selection-limiter pertaining to use of the vehicle 102. The use indicator 334 can indicate a time or distance associated with the vehicle 102. At least one of the time or distance can be entered manually via the user input section 304 or determined automatically by the processor 202 from a VDM received by the DLC connector 206. If a CTT selection-limiter pertaining to use of the vehicle 102 has not been entered, the display 302 can highlight the use indicator 334 to prompt a user to input a time or distance associated with the vehicle. Other selection-limiter fields can be highlighted as well to prompt a user to input or enable the highlighted selection-limiter.

The location indicator 336 can display a CTT selection-limiter pertaining to a location, such as a location associated with the VST 300 or a location associated with the vehicle 102. At least one of a location associated with the VST 300 or a location associated with the vehicle 102 can be entered manually via the user input section 304 or determined automatically by the processor 202 from a VDM received by the DLC connector 206. If a CTT selection-limiter pertaining to a location has not been entered, the display 302 can highlight the location indicator 336 to prompt a user to input a location, such as a location associated with the VST 300 or a location associated with the vehicle 102.

The housing 326 can provide support or protection for at least a portion of any of the components of the VST 300, which can include any one or more of the components of the VST 200. The housing 326 can include one or more hand grips. The housing 326 can include one or more port openings for connecting a communication link, such as communication link 114 to the VST 300.

III. Example Operation

Figure 6:
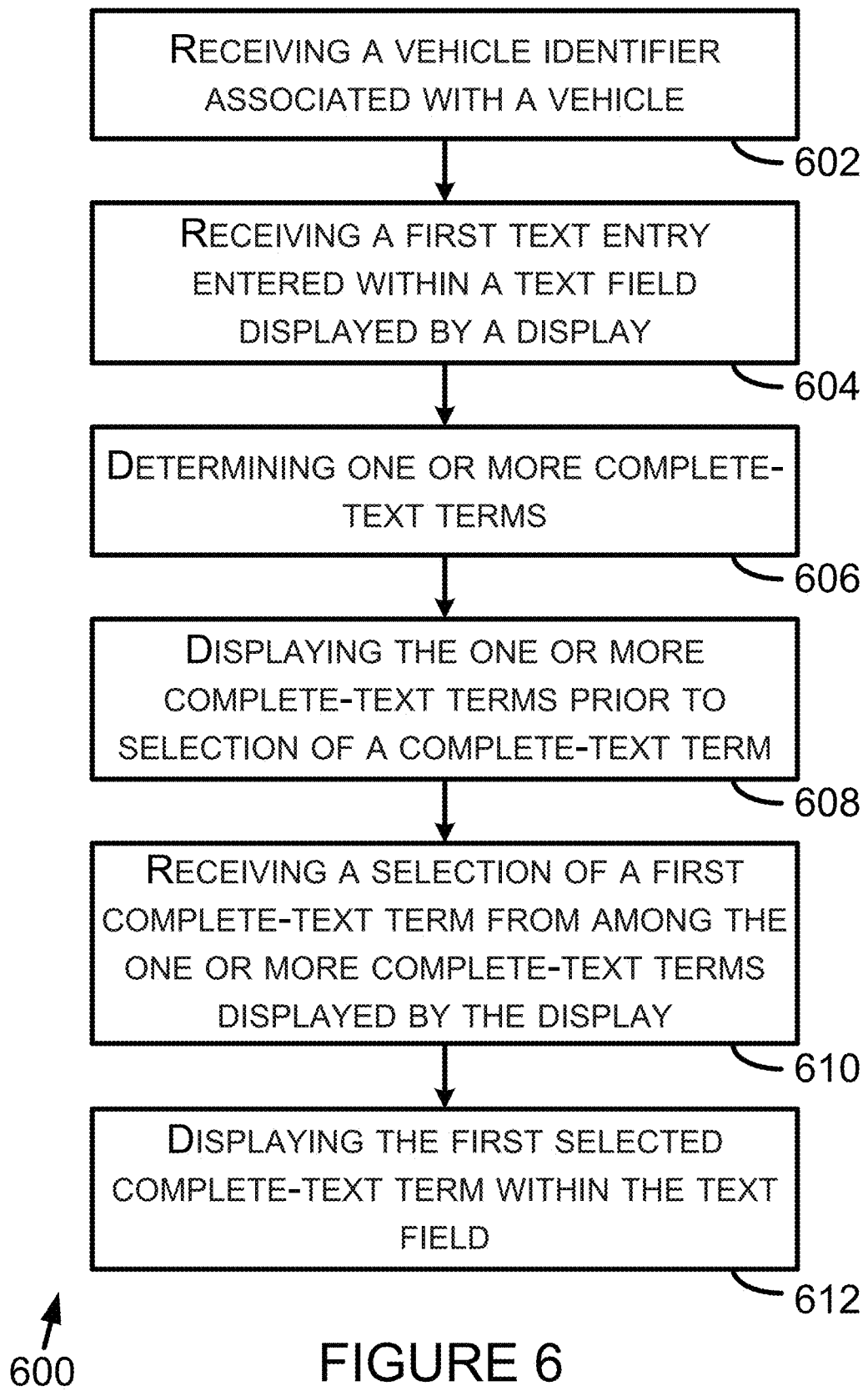
FIG. 6 is a flowchart depicting a set of functions that can be carried out in accordance with one or more example embodiments.

Next, FIG. 6 is a flowchart depicting a set of functions 600 (or more simply "the set 600") that can be carried out in accordance with one or more example embodiments described herein. The set 600 includes the functions shown in blocks labeled with even numbers 602 through 612 inclusive. The following description of the set 600 includes references to elements shown in other figures in this application, but the functions of the set 600 are not limited to be carried out by the referenced elements. A variety of methods can be performed using one or more of the functions shown in the set 600. Any of those methods can be performed with other functions such as one or more of the other functions described herein.

Block 602 includes receiving a vehicle identifier associated with a vehicle, such as the vehicle 102. Various components of a VST can receive a vehicle ID. For example, the processor 202, the user interface 208, the DLC connector 206, or the communication link transceiver 210 can receive a vehicle ID. The processor 202 can receive the vehicle ID from the user interface 208, the DLC connector 206, or the communication link transceiver 210. The user interface 208 can receive the vehicle ID by selection of the vehicle ID using one or more of the character selection 312, the display pointer 314 and an input key of the user input section 304. The DLC connector 206 can receive the vehicle ID from the ECU 108 within the vehicle 102 by way of the communication link 114. The communication link transceiver 210 can receive a vehicle ID from a computing device off-board the VST 200.

The vehicle associated with the received vehicle identifier can include a vehicle that is connected to the VST 200 by way of the communication link 114. Alternatively, the vehicle associated with the received vehicle identifier can include a vehicle that is not connected to the VST 200, or even in proximity to the VST 200, when the vehicle identifier is received. Accordingly, as will be discussed, complete-text terms can be determined by the processor 200 even if the vehicle associated with the vehicle identifier is not in proximity to the VST 200.

Receiving a vehicle ID can include receiving one or more vehicle ID elements such as, but not limited to, any of the vehicle ID elements discussed in this description. Receiving multiple vehicle ID elements can include a first component of a VST (e.g., the DLC connector 206) receiving a first vehicle ID element (e.g., an engine type) and a second component of the VST (e.g., the user interface 208) receiving a second vehicle ID element (e.g., a vehicle model year). Receiving a vehicle ID element can include the display pointer 314 or an input key of the user input section 304 being used to select the vehicle ID element from a list of selectable vehicle ID elements displayed by the display 302.

Next, block 604 includes receiving a first text entry entered within a text field displayed by a display, such as a display of user interface 208 or display 302. The character selection field 312 can be used to select characters (e.g., alphabet letters, numerals, non-alphabetic-and-non-numeral characters, or complete-text terms) for entering into the text field 308. For example, the first text entry can be any of the letters shown in the text entries of Table 1. The processor 202 can execute the CRPI 216 to determine each text entry and to cause each text entry to be stored within the text entries 220 and to be displayed by the display.

Next, block 606 includes determining one or more complete-text terms. The processor 202 can execute the CRPI 216 to determine the one or more complete-text terms. Each of the one or more complete-text terms can be associated with the vehicle identifier and the first text entry. Each of the one or more complete-text terms can include at least one more text character than the first text entry.

The one or more CTT can include multiple CTT (i.e., at least two CTT). A processor, such as processor 202 or the off-board processor 118, can determine an order for displaying the multiple CTT. The order of the CTT can be based, at least in part, on a statistic corresponding to each CTT having been selected or non-selected as a CTT for insertion into a text field while the CTT was displayed in response to prior instances of text-entry into a displayed text field.

Next, block 608 includes displaying the one or more complete-text terms prior to selection of a complete-text term from among the one or more complete-text terms. The user interface 208, or more particularly the display 302, can display the one or more complete-text terms. In accordance with an example in which multiple CTT are displayed, the multiple CTT can be displayed in an order determined by a processor, such as processor 202 or the off-board processor 118. Displaying the CTT in an order in which the most popular CTT are listed first or at the top of a list of CTT can be helpful to a user of the VST 200 so that the user does not have to scroll through less popular CTT to locate a desired CTT.

Next, block 610 includes receiving a selection of a first complete-text term from among the one or more complete-text terms displayed by the display 302. The display pointer 314 or an input key from the user input section 304 can be used to select the first complete-text term from the CTT field 310. The processor 202 can execute the CRPI 216 to receive the selection from the user interface 208 by way of the communication mechanism 214.

In one respect, the selected complete-text term includes the first text entry (e.g., an initial text entry in an empty text field or a text entry after an initial text entry in an empty text field). Table 1 shows data in which all of the text entries are included in the selected complete-text term. The initial text entry in Table 1 is "E" shown in the second row of Table 1. The last letter in the text entry of each row in Table 1 can be considered a most-recent text entry until another most-recent text entry is entered for a lower row of Table 1. Any text entry in Table 1 or the most-recent text entry in each row can be considered the first text entry received at block 604.

In another respect, the selected complete-text term does not include the first text entry. For example, the text entries could spell out the term "FIREWALL," which is an obsolete term according to at least some vehicle manufacturers. In response to an attempt to enter or select the term "FIREWALL," the processor 202 may automatically insert the term "COWL" into the text field 308 since, according to at least some vehicle manufacturers, "COWL" is a more acceptable term for the area of a vehicle formerly referred to as a firewall. The CTT term field 310 may display the term "FIREWALL" as "FIREWALL (COWL)" to provide an indication that a standard term ("COWL") will be inserted into the text field 308 instead of the term including all of the text entered to select the CTT. The VST 200 can include an override feature such that the standard term (e.g., "COWL") is presented to the user for entering into the text field 308, yet the user can be allowed to enter a non-standard term (e.g., "FIREWALL") if desired by the user.

Next, block 612 includes displaying the first selected complete-text term within the text field. The user interface 208, or more particularly the display 302, can display the first first-selected complete-text term in the text field 308. As an example, if the first selected CTT is the term "Engine" selected from the CTT term field 310, as shown in FIG. 3, as shown in FIG. 4 and FIG. 5, the display 302 displays the "Engine" CTT in the text field 308.

Additional functions that can be performed alone or with one or more other functions described herein are now described. The description of these additional functions includes references to elements shown in the figures, but the additional functions are not limited to be carried out by the referenced elements. Some of these additional functions include multiple additional functions.

A first additional function includes receiving a second text entry entered within the text field 308 displaying the first selected CTT. The first additional function can include the processor 202 determining one or more additional CTT. Each of the one or more additional CTT can be associated with the vehicle identifier and the second text entry. Each of the one or more additional CTT can be associated with the first selected CTT and a position relative to the first selected CTT (e.g., a position occurring immediately after the first selected CTT). Each of the one or more additional CTT can include at least one more text character than the second text entry. The first additional function can include displaying, by the display 302, the one or more additional CTT prior to selection of a CTT from among the one or more additional CTT. The first additional function can include receiving, by the processor 202, a selection of a second CTT from among the one or more additional CTT displayed by the display 302. The first additional function can include displaying, by the display 302, the first selected CTT and the second selected CTT within the text field 308.

A second additional function includes receiving a complete-text term selection-limiter. The determining function described above with respect to block 606 (or any other CTT determining function described herein) can be further based on the CTT selection-limiter. The CTT selection-limiter can be received by the processor 202, the data storage device 204, the DLC connector 206, the user interface 208, or the communication link transceiver 210. A CTT selection-limiter can include, but is not limited to, a use indicator indicating a time associated with the vehicle 102, a use indicator indicating a distance associated with the vehicle 102, a diagnostic trouble code identifier, a geographic location indicator, or a text category indicator.

Receiving the CTT selection-limiter can include receiving multiple CTT selection-limiters. The multiple CTT selection-limiters can be received by the same VST component or different VST components. For example, one or more CTT selection-limiters can be received by the DLC connector 206 receiving, from the vehicle 102, a vehicle data message including the one or more CTT selection-limiters or data from which the one or more CTT selection-limiters can be derived, and one or more other CTT selection-limiters can be received by the user interface 208.

A third additional function includes storing, by a computer-readable medium, a database of complete-text terms. The database or the CTT thereof can form, or be part of, a taxonomy of terms. The taxonomy of CTT can assist with entering data into a text field, such as the text field 308. The computer-readable medium can store, for each CTT, at least one prior text entry associated with that CTT. The determining function at block 606 can include the processor 202 determining, from the database, that the at least one prior text entry associated with the complete-text terms matches the first text entry received at block 602. The database can include a set of CTT associated with the first text entry. The set of CTT can include the selected CTT and at least one other CTT. The CTT of the set of CTT can be ordered in a sequence based on a rate (or a statistic indicating the rate) at which each of the CTT was previously selected to complete a text term within the text field 308.

A fourth additional function includes generating, by the processor 202, a repair order including a selected complete-text term (e.g., the CTT selected at block 610) within a repair order field corresponding to a text field for which the CTT was selected or displayed. The repair order generated using the selected CTT can be tagged by the processor 202 to indicate that the selected CTT, alone or with one or more other selected CTT, was inserted into the repair order field. During a post vehicle-repair process, a processor, such as the off-board processor 118 can determine that an RO is tagged to indicate a CTT has been inserted into an RO field on the RO. Based on that determination, the off-board processor 118 can skip searching for common-text terms for the tagged RO fields as those fields already include a CTT. The burden on the off-board processor 118 to search for CTT for an RO field can therefore be reduced.

Displaying the one or more complete-text terms at block 608 can be based on a statistic regarding prior selection or non-selection of each complete-text term of the one or more complete-text terms. Displaying the one or more complete-text terms based on the statistic can include displaying two or more CTT in a particular order, but is not so limited. A fifth additional function includes modifying that statistic regarding selection or non-selection of each complete-text term from among the one or more complete-text terms displayed at block 608. During a subsequent displaying of one or more complete-text terms based on the same data used to determine the one or more complete-text terms at block 606, the subsequently displayed one or more complete-text terms can be displayed in an order based upon the modified statistic.

A sixth additional function includes receiving a selection of enabling a vehicle leveraging mode or disabling the vehicle leveraging mode. The processor 202 can change the vehicle leveraging indicator 330 so that it indicates whether the vehicle leveraging mode is enabled or disabled. The one or more complete-text terms displayed within the CTT text field 310 can be based on whether the vehicle leveraging indicator is enabled or disabled and if one or more other vehicle types similar to the vehicle type of vehicle 102 have complete-text terms for determining the one or more complete-text terms at block 606.

IV. Example Computer-Readable Medium

As indicated above, the data storage device 204 includes CRPI 216. Accordingly, a computer-readable medium can store program instructions, that when executed by a computing device (e.g., the processor 202), cause a set of functions to be performed. For purposes of this description, this set of functions is referred to herein as "the set of example functions."

As an example, the set of example functions can include: (i) receiving, by a processor, a vehicle identifier associated with a vehicle, (ii) receiving, by the processor, a first text entry entered within a text field displayed by a display, (iii) determining, by the processor, one or more complete-text terms, (iv) displaying, by the display, the one or more complete-text terms prior to selection of a complete-text term from among the one or more complete-text terms, (v) receiving, by the processor, a selection of a first complete-text term from among the one or more complete-text terms displayed by the device, and (vi) displaying, by the display, the first selected complete-text term within the text field. In accordance with the set of example functions, each of the one or more complete-text terms is associated with the vehicle identifier and the first text entry and each of the one or more complete-text terms includes at least one more text character than the first text entry.

As another example, the set of example functions can include one or more of the functions (i), (ii), (iii), (iv), (v) and (vi) listed in the previous paragraph and at least one other function of any of the functions described herein as being performed by a VST, or any component of a VST.

V. Conclusion

Example embodiments have been described above. Those skilled in the art will understand that changes and modifications can be made to the described embodiments without departing from the true scope and spirit of the present invention, which is defined by the claims. For instance, although many of the example embodiments are described with respect to a vehicle and a vehicle service tool, the person skilled in the art will understand that the vehicle referred to herein can be replaced by some other serviceable device such as, but not limited to, medical equipment, appliances (e.g., refrigerators or washing machines), or televisions. In such instance, the vehicle service tools described herein can be referred to more simply as a "service tool."

We claim:

1. A method comprising:
   receiving, at one or more processors, a first vehicle identifier associated with a particular vehicle, wherein the first vehicle identifier includes a first vehicle model year, a first vehicle make, and a first vehicle model name;
   receiving, at the one or more processors, a use indicator indicating a time associated with the particular vehicle or a distance associated with the particular vehicle;
   receiving, at the one or more processors, a first text entry entered within a text field displayed on a display;
   determining, at the one or more processors, one or more complete-text terms conditioned on the use indicator, wherein each of the one or more complete-text terms begins with the first text entry and includes at least one more text character than the first text entry;
   displaying, on the display, the one or more complete-text terms prior to selection of a first complete-text term from among the one or more complete-text terms;
   receiving, at the one or more processors, a selection of the first complete-text term from among the one or more complete-text terms displayed on the display; and
   displaying, on the display, the first complete-text term within the text field.

2. A method according to claim 1, wherein determining one or more complete-text terms conditioned on the use indicator includes determining that the one or more complete-text terms are associated with a time or distance range including the use indicator.

3. A method according to claim 2, further comprising:
   excluding from the one or more complete-text terms conditioned on the use indicator, by the one or more processors, one or more other complete-text terms that are not associated with the time or distance range.

4. A method according to claim 1, wherein determining one or more complete-text terms conditioned on the use indicator includes determining, at the one or more processors, complete-text terms associated with metadata indicative of the first vehicle identifier and the use indicator.

5. A method according to claim 1, further comprising:
receiving, at the one or more processors, a second text entry entered within the text field displaying the first complete-text term;
determining, at the one or more processors, one or more additional complete-text terms, wherein each of the one or more additional complete-text terms is associated with the first vehicle identifier and the second text entry, wherein each of the one or more additional complete-text terms includes at least one more text character than the second text entry;
displaying, on the display, the one or more additional complete-text terms prior to selection of a second complete-text term from among the one or more additional complete-text terms;
receiving, at the one or more processors, a selection of the second complete-text term from among the one or more additional complete-text terms displayed on the display; and
displaying, on the display, the first complete-text term and the second complete-text term within the text field.

6. A method according to claim 1,
wherein receiving the first text entry includes receiving a first sequence of text characters and at least one additional text character such that a second sequence of text characters including the first sequence of text characters and the at least one additional text character is received, and
wherein determining one or more complete-text terms includes determining that at least one complete-text term that matches the first sequence of text characters does not match the second sequence of text characters and excluding the at least one complete-text term from the one or more complete-text terms.

7. A method according to claim 1, further comprising:
generating, at the one or more processors, a repair order including the first complete-text term within a repair order field corresponding to the text field displayed on the display; and
tagging, at the one or more processors, the repair order to identify that the first complete-text term was inserted into the repair order field.

8. A method according to claim 1, further comprising:
storing, at a non-transitory computer-readable medium, a database of complete-text terms, and, for each stored complete-text term, at least one prior text entry associated with the stored complete-text term,
wherein determining one or more complete-text terms includes determining, from the database of complete-text terms, the at least one prior text entry associated with the stored complete-text term matches the first text entry, and optionally
wherein the database of complete-text terms includes a set of complete-text terms associated with the first text entry, the set of complete-text terms includes the first complete-text term and at least one other complete-text term, and the complete-text terms of the set of complete-text terms are ordered in a sequence based on a rate at which each of the complete-text terms was previously selected to complete a text term within a text field.

9. A method according to claim 1, further comprising:
modifying, at the one or more processors, a statistic regarding selection or non-selection of each complete-text term among the one or more complete-text terms,
wherein displaying the one or more complete-text terms includes displaying the one or more complete-text terms based on the statistic regarding selection or non-selection of each complete-text term among the one or more complete-text terms prior to the one or more processors modifying the statistic.

10. A method according to claim 1,
wherein the one or more complete-text terms includes at least two complete-text terms, the method further comprising:
determining, at the one or more processors, an order for displaying the at least two complete-text terms, wherein the order is based, at least in part, on a statistic corresponding to each complete-text term being selected or non-selected as a complete-text term after being displayed in response to prior instances of text-entry into a displayed text field,
wherein displaying the one or more complete-text terms includes displaying the one or more complete-text terms according to the order for displaying the at least two complete-text terms.

11. A method according to claim 1, further comprising:
receiving a selection of enabling a vehicle leveraging mode or disabling the vehicle leveraging mode, and
wherein the one or more complete-text terms conditioned on the use indicator change upon receiving the selection of enabling the vehicle leveraging mode or disabling the vehicle leveraging mode.

12. A method according to claim 1, further comprising:
switching, at the one or more processors, a vehicle leveraging mode programmed into the one or more processors from a disable stated to an enabled state;
changing, at the one or more processors in response to the vehicle leveraging mode switching to the enabled state, the one or more complete-text terms displayed on the display prior to selection of the first complete-text term;
displaying, on the display in response to switching the vehicle leveraging mode to the enabled state, a vehicle identifier field showing the first vehicle identifier and at least a second vehicle identifier,
wherein the second vehicle identifier includes a second vehicle model year, a second vehicle make, and a second vehicle model name, and
wherein a combination of the first vehicle model year, the first vehicle make, and the first vehicle model name is different than a combination of the second vehicle model year, the second vehicle make, and the second vehicle model name.

13. A method according to claim 12,
displaying, on the display in response to switching the vehicle leveraging mode to the enabled state, the vehicle identifier field showing the first vehicle identifier and at least a second vehicle identifier,
wherein the first vehicle identifier further includes one or both of a first engine identifier and a first system identifier,
wherein the second vehicle identifier includes a second vehicle model year, a second vehicle make, a second vehicle model name, and one or both of a second engine identifier and a second system identifier, and wherein a combination of the first vehicle model year, the first vehicle make, the first vehicle model name, and one or both of the first engine identifier and the first system identifier is different than a combination of the second vehicle model year, the second vehicle make, the second vehicle model name, and one or both of the second engine identifier and the second system identifier.

14. A method according to claim 12, further comprising one or more from among:
   (A) displaying, on the display, a vehicle leveraging indicator configured to indicate the vehicle leveraging mode is in a disabled state after the one or more processors has switched the vehicle leveraging mode to the disabled state and to indicate the vehicle leveraging mode is in the enabled state after the one or more processors has switched the vehicle leveraging mode to the enabled state;
   (B) receiving, at the one or more processors, a manual selection to enable the vehicle leveraging mode, wherein the manual selection is made via the display or a user input key communicatively coupled to the one or more processors, and wherein switching to an enabled stated occurs in response to receiving the manual selection; or
   (C) displaying, on the display, a diagnostic trouble code field including at least a first diagnostic trouble code identifier associated with a particular diagnostic trouble code set in the particular vehicle; and changing, at the one or more processors in response to the vehicle leveraging mode switching to the enabled state, the diagnostic trouble code field to display at least the first diagnostic trouble code identifier and a second diagnostic trouble code identifier.

15. A method according to claim 1,
wherein receiving the first vehicle identifier includes the one or more processors receiving a vehicle data message from the particular vehicle, and
wherein the vehicle data message includes at least a portion of a vehicle identification number associated with the particular vehicle.

16. A method according to claim 1,
wherein at least one of the one or more complete-text terms includes two or more separate words, and optionally,
wherein receiving the first text entry includes receiving text characters of a first word of two or more separate words, a space, and at least one character of a second word of the two or more separate words.

17. A system comprising:
a user interface including a display;
one or more processors; and
a non-transitory computer-readable medium storing computer-readable program instructions executable at the one or more processors to perform a set of functions, the set of functions comprising:
receiving a first vehicle identifier associated with a particular vehicle, wherein the first vehicle identifier includes a first vehicle model year, a first vehicle make, and a first vehicle model name;
receiving a use indicator indicating a time associated with the particular vehicle or a distance associated with the particular vehicle;
receiving a first text entry entered within a text field displayed on a display;
determining one or more complete-text terms conditioned on the use indicator, wherein each of the one or more complete-text terms begins with the first text entry and includes at least one more text character than the first text entry;
outputting, for displaying on the display, the one or more complete-text terms prior to selection of a first complete-text term from among the one or more complete-text terms;
receiving a selection of the first complete-text term from among the one or more complete-text terms displayed on the display; and
outputting, for displaying on the display, the first complete-text term within the text field.

18. A system according to claim 17,
wherein determining one or more complete-text terms conditioned on the use indicator includes determining that the one or more complete-text terms are associated with a time or distance range including the use indicator.

19. A system according to claim 18, wherein the set of functions further includes:
excluding from the one or more complete-text terms conditioned on the use indicator, by the one or more processors, one or more other complete-text terms that are not associated with the time or distance range.

20. A system according to claim 17, wherein determining one or more complete-text terms conditioned on the use indicator includes determining, at the one or more processors, complete-text terms associated with metadata indicative of the first vehicle identifier and the use indicator.

21. A system according to claim 17,
a communication link transceiver to receive a complete set of complete-text terms or a partial set of complete-text terms,
wherein the complete set of complete-text terms or the partial set of complete-text terms is based on, at least in part, the first vehicle identifier and the use indicator.

22. A system according to claim 21,
wherein the communication link transceiver is configured to transmit a request for a set of complete-text terms,
wherein the request for the set of complete-text terms includes the first vehicle identifier and the use indicator, and
wherein the complete set of complete-text terms or the partial set of complete-text terms is received in response to the request for the set of complete-text terms.

23. A system according to claim 17, wherein the set of functions further comprise:
receiving, at the one or more processors, a second text entry entered within the text field displaying the first complete-text term;
determining, at the one or more processors, one or more additional complete-text terms, wherein each of the one or more additional complete-text terms is associated with the first vehicle identifier and the second text entry, wherein each of the one or more additional complete-text terms includes at least one more text character than the second text entry;
displaying, on the display, the one or more additional complete-text terms prior to selection of a second complete-text term from among the one or more additional complete-text terms;
receiving, at the one or more processors, a selection of the second complete-text term from among the one or more additional complete-text terms displayed on the display; and displaying, on the display, the first complete-text term and the second complete-text term within the text field.

24. A system according to claim 17,
wherein receiving the first text entry includes receiving a first sequence of text characters and at least one additional text character such that a second sequence of text characters including the first sequence of text characters and the at least one additional text character is received, and
wherein determining one or more complete-text terms includes determining that at least one complete-text term that matches the first sequence of text characters does not match the second sequence of text characters and excluding the at least one complete-text term from the one or more complete-text terms.

25. A system according to claim 17, wherein the set of functions further comprise:
generating, at the one or more processors, a repair order including the first complete-text term within a repair order field corresponding to the text field displayed on the display; and
tagging, at the one or more processors, the repair order to identify that the first complete-text term was inserted into the repair order field.

26. A system according to claim 17, wherein the set of functions further comprise:
storing, at a non-transitory computer-readable medium, a database of complete-text terms, and, for each stored complete-text term, at least one prior text entry associated with the stored complete-text term,
wherein determining one or more complete-text terms includes determining, from the database of complete-text terms, the at least one prior text entry associated with the stored complete-text term matches the first text entry, and optionally
wherein the database of complete-text terms includes a set of complete-text terms associated with the first text entry, the set of complete-text terms includes the first complete-text term and at least one other complete-text term, and the complete-text terms of the set of complete-text terms are ordered in a sequence based on a rate at which each of the complete-text terms was previously selected to complete a text term within a text field.

27. A system according to claim 17, wherein the set of functions further comprise:
modifying, at the one or more processors, a statistic regarding selection or non-selection of each complete-text term among the one or more complete-text terms,
wherein displaying the one or more complete-text terms includes displaying the one or more complete-text terms based on the statistic regarding selection or non-selection of each complete-text term among the one or more complete-text terms prior to the one or more processors modifying the statistic.

28. A system according to claim 17,
wherein the one or more complete-text terms includes at least two complete-text terms,
wherein the set of functions further comprise determining, at the one or more processors, an order for displaying the at least two complete-text terms, wherein the order is based, at least in part, on a statistic corresponding to each complete-text term being selected or non-selected as a complete-text term after being displayed in response to prior instances of text-entry into a displayed text field, and
wherein displaying the one or more complete-text terms includes displaying the one or more complete-text terms according to the order for displaying the at least two complete-text terms.

29. A system according to claim 17, wherein the set of functions further comprise:
receiving a selection of enabling a vehicle leveraging mode or disabling the vehicle leveraging mode, and
wherein the one or more complete-text terms conditioned on the use indicator change upon receiving the selection of enabling the vehicle leveraging mode or disabling the vehicle leveraging mode.

30. A system according to claim 17, wherein the set of functions further comprise:
switching, at the one or more processors, a vehicle leveraging mode programmed into the one or more processors from a disable stated to an enabled state;
changing, at the one or more processors in response to the vehicle leveraging mode switching to the enabled state, the one or more complete-text terms displayed on the display prior to selection of the first complete-text term;
displaying, on the display in response to switching the vehicle leveraging mode to the enabled state, a vehicle identifier field showing the first vehicle identifier and at least a second vehicle identifier,
wherein the second vehicle identifier includes a second vehicle model year, a second vehicle make, and a second vehicle model name, and
wherein a combination of the first vehicle model year, the first vehicle make, and the first vehicle model name is different than a combination of the second vehicle model year, the second vehicle make, and the second vehicle model name.

31. A system according to claim 30, wherein the set of functions further comprise:
displaying, on the display in response to switching the vehicle leveraging mode to the enabled state, the vehicle identifier field showing the first vehicle identifier and at least a second vehicle identifier,
wherein the first vehicle identifier further includes one or both of a first engine identifier and a first system identifier,
wherein the second vehicle identifier includes a second vehicle model year, a second vehicle make, a second vehicle model name, and one or both of a second engine identifier and a second system identifier, and
wherein a combination of the first vehicle model year, the first vehicle make, the first vehicle model name, and one or both of the first engine identifier and the first system identifier is different than a combination of the second vehicle model year, the second vehicle make, the second vehicle model name, and one or both of the second engine identifier and the second system identifier.

32. A system according to claim 30, wherein the set of functions further comprise one or more from among:
(A) displaying, on the display, a vehicle leveraging indicator configured to indicate the vehicle leveraging mode is in a disabled state after the one or more processors has switched the vehicle leveraging mode to the disabled state and to indicate the vehicle leveraging mode is in the enabled state after the one or more processors has switched the vehicle leveraging mode to the enabled state;
(B) receiving, at the one or more processors, a manual selection to enable the vehicle leveraging mode, wherein the manual selection is made via the display or a user input key communicatively coupled to the one or more processors, and wherein switching to an enabled stated occurs in response to receiving the manual selection; or (C) displaying, on the display, a diagnostic trouble code field including at least a first diagnostic trouble code identifier associated with a particular diagnostic trouble code set in the particular vehicle; and changing, at the one or more processors in response to the vehicle leveraging mode switching to the enabled state, the diagnostic trouble code field to display at least the first diagnostic trouble code identifier and a second diagnostic trouble code identifier.

33. A system according to claim 17, wherein receiving the first vehicle identifier includes the one or more processors receiving a vehicle data message from the particular vehicle, and wherein the vehicle data message includes at least a portion of a vehicle identification number associated with the particular vehicle.

34. A system according to claim 17, wherein at least one of the one or more complete-text terms includes two or more separate words, and optionally, wherein receiving the first text entry includes receiving text characters of a first word of two or more separate words, a space, and at least one character of a second word of the two or more separate words.

35. A non-transitory computer-readable medium having stored therein instructions executable by one or more processors to cause a computing system having a display screen and the one or more processors to perform functions comprising:

receiving, at one or more processors, a first vehicle identifier associated with a particular vehicle, wherein the first vehicle identifier includes a first vehicle model year, a first vehicle make, and a first vehicle model name;

receiving, at the one or more processors, a use indicator indicating a time associated with the particular vehicle or a distance associated with the particular vehicle;

receiving, at the one or more processors, a first text entry entered within a text field displayed on a display;

determining, at the one or more processors, one or more complete-text terms conditioned on the use indicator, wherein each of the one or more complete-text terms begins with the first text entry and includes at least one more text character than the first text entry;

displaying, on the display, the one or more complete-text terms prior to selection of a first complete-text term from among the one or more complete-text terms;

receiving, at the one or more processors, a selection of the first complete-text term from among the one or more complete-text terms displayed on the display; and displaying, on the display, the first complete-text term within the text field.

36. A non-transitory computer-readable medium according to claim 35, wherein determining one or more complete-text terms conditioned on the use indicator includes determining that the one or more complete-text terms are associated with a time or distance range including the use indicator.

37. A non-transitory computer-readable medium according to claim 36, further comprising:

excluding from the one or more complete-text terms conditioned on the use indicator, by the one or more processors, one or more other complete-text terms that are not associated with the time or distance range.

38. A non-transitory computer-readable medium according to claim 35, wherein determining one or more complete-text terms conditioned on the use indicator includes determining, at the one or more processors, complete-text terms associated with metadata indicative of the first vehicle identifier and the use indicator.

* * * * *